UNITED STATES PATENT OFFICE.

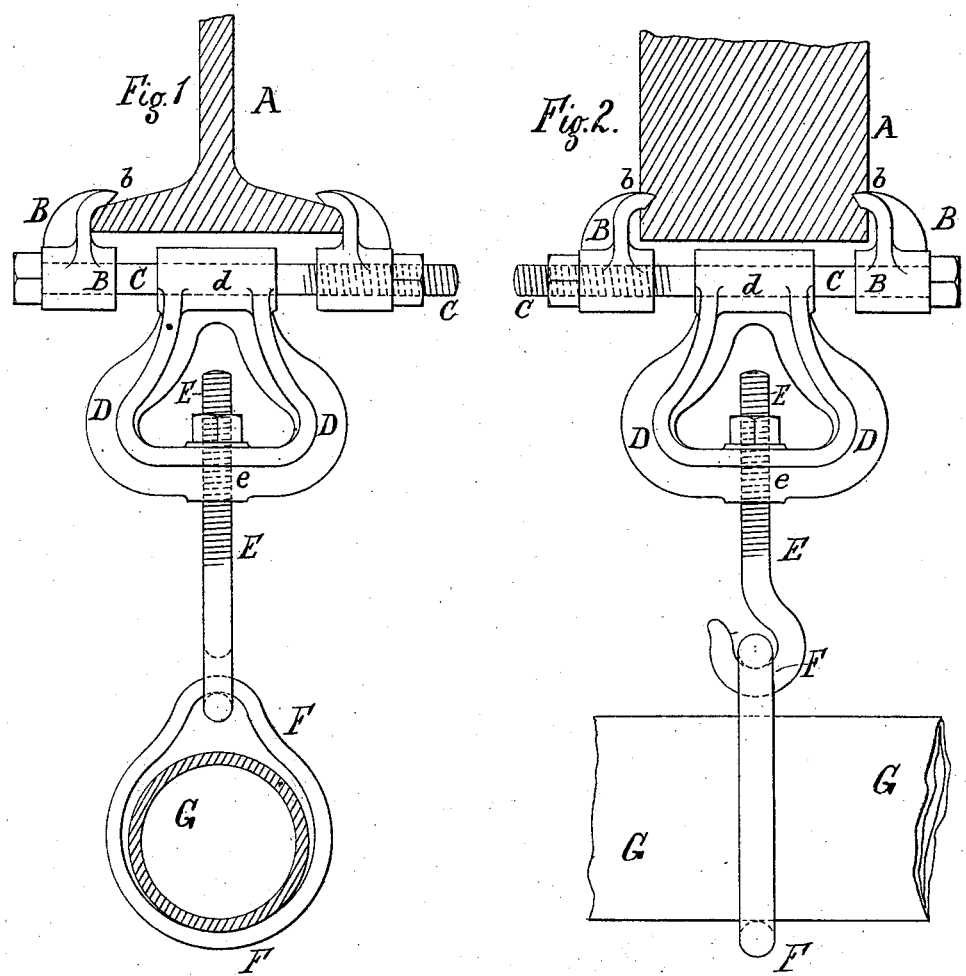

PERCY N. KENWAY, OF NEW YORK, N. Y.

HANGER FOR PIPING.

SPECIFICATION forming part of Letters Patent No. 347,489, dated August 17, 1886.

Application filed August 24, 1885. Serial No. 175,181. (No model.)

*To all whom it may concern:*

Be it known that I, PERCY N. KENWAY, a subject of the Queen of Great Britain, and a resident of the city, county, and State of New York, have invented certain new and useful Improvements in Hangers for Piping, of which the following is a specification.

My invention relates to adjustable hangers, whereby piping of all sorts and for all purposes—steam, gas, water, and the like—are suspended from floor-beams, timbers, or other supports; and the object of such invention is to provide a support or hanger adjustable in every direction, suitable to all kinds of movement and expansion, and capable of being readily applied to new constructions, as well as to piping already connected and in place without removal or disconnecting.

Certain of my improvements consist in the combination of a bolt and grips or clamps, whereby any width of beam, timber, or bracing may be taken hold of, and a pocket or suspender swinging or oscillating upon the bolt, to which pocket or suspender a bolt or hook is attached for the purpose of suspending or supporting one or more lines of piping, as may be necessary, at any required elevation, or in any required position—parallel, perpendicular, or at any angle to the grip-bolt or beam.

In the accompanying drawings, Figure 1 represents a hanger embodying my improvements adjusted to clamp an ordinary iron beam, and with piping running parallel to the center line of beam and perpendicular to the grip-bolt. Fig. 2 represents a hanger embodying my improvements adjusted to grip or clamp a wooden beam or support, having the piping running perpendicular to center line of beam and parallel with the grip or clamp bolt.

Similar letters of reference designate corresponding parts in all the figures.

A designates a beam, timber, or other support to which the adjustable hanger is attached.

B designates the clamps or grips, through which is passed a bolt or rod, C, to hold them in position up to their work.

In Fig. 1 the clamps B are drawn or pressed to a close contact at the neck against the flange of the beam, while in Fig. 2 the clamps or grips B are pressed at the jaws into the wood, so that the points or prongs *b b* by their grip hold the complete hanger in position. The faces of such prongs are chisel-shaped, as shown at *b b*.

D designates a pocket or suspender, through the upper portion or hub, *d*, of which is passed the grip-bolt C, and through whose lower portion or hub, *e*, is passed the suspension bolt or hook E. The hub *d* is made of less width than the space between the faces of the clamps or grips B B when set to position on the beam, timber, or support to which it may be applied, effecting a movement to and fro on the bolt C in case of necessity for adjustment or expansion.

E designates an adjustable suspension bolt or hook passing through lower hub, *e*, of swing-pocket D, to which suspension bolt or hook the piping in one or more lines may be attached by means of rings, cords, or hangers F.

G designates the piping, about which the rings, wires, cords, chains, or straps may be wrapped to hold it in suspension at required height, angle, position, or adjustment.

In the placing or erection of these hangers the clamps or grips B B are made to bite the beam, either metal or wood, and the bolt C passed through the hubs of the same, at the same time slipping the pocket or suspender D over the bolt C at the hub *b*. The bolt is then tightened to firmly clamp the beam, timber, or support to which the hanger is to be secured. The suspension bolt or hook is then passed through the lower hub of the pocket or suspender, and a nut applied for the purposes of adjustment. Under such conditions of erection and adjustment the whole hanger meets the requirements of expansion, contraction, and detailed accommodation necessary to the proper erection and durability of the piping supported, no matter to what use it may be put.

What I claim as new, and desire to secure by Letters Patent, is—

1. The combination of a pair of grip-clamps, a bolt for holding them together and in a fixed position, a swing-pocket, through the upper portion of which the said bolt passes, and upon which it slides longitudinally, a hook or bolt passing through and adjustable upon the lower portion of swing-pocket, and a suspension ring or hanger through which the piping passes, substantially as and for the purposes specified.

2. The combination of the beam clamps or grips B, the bolt C, suspending-pocket D, adjustable hook or bolt E, and the pipe strap or ring F, substantially as and for the purposes specified.

PERCY N. KENWAY.

Witnesses:
WM. H. WEIGHTMAN,
W. J. MORGAN.